United States Patent
Armbrust

(10) Patent No.: US 10,427,320 B1
(45) Date of Patent: Oct. 1, 2019

(54) TREE GIRDLING TOOL

(71) Applicant: Ryan W. Armbrust, Alta Vista, KS (US)

(72) Inventor: Ryan W. Armbrust, Alta Vista, KS (US)

( * ) Notice: Subject to any disclaimer, the term of this patent is extended or adjusted under 35 U.S.C. 154(b) by 222 days.

(21) Appl. No.: 15/802,713

(22) Filed: Nov. 3, 2017

Related U.S. Application Data

(62) Division of application No. 15/214,715, filed on Jul. 20, 2016, now Pat. No. 9,840,021.

(51) Int. Cl.
*A01G 3/00* (2006.01)
*B27L 1/06* (2006.01)

(52) U.S. Cl.
CPC . *B27L 1/06* (2013.01); *A01G 3/00* (2013.01)

(58) Field of Classification Search
CPC .................................. B27L 1/06; A01G 3/00
USPC ...................... 144/208.92; 30/121; 47/1.01 R
See application file for complete search history.

(56) References Cited

U.S. PATENT DOCUMENTS

| | | | | |
|---|---|---|---|---|
| 278,686 A | * | 6/1883 | Daigneau | A01G 23/12 144/208.92 |
| 973,494 A | * | 10/1910 | Friedlund | A01G 23/12 30/121 |
| 1,901,946 A | * | 3/1933 | Bark | A01G 23/12 30/121 |
| 2,180,150 A | * | 11/1939 | Knight, Jr. | A01G 20/30 47/1.01 R |
| 2,552,652 A | * | 5/1951 | Stasiek | A01G 23/099 30/121 |
| 2,655,763 A | * | 10/1953 | Grissett | A01G 23/099 47/1.01 R |
| 2,760,307 A | * | 8/1956 | Tiblom | A01G 23/099 47/1.01 R |
| 2,792,670 A | * | 5/1957 | Haynes | A01G 3/08 47/1.01 R |
| 2,870,572 A | * | 1/1959 | Grissett | A01G 3/00 47/1.01 R |
| 4,029,134 A | | 6/1977 | Cook et al. | |
| 4,188,718 A | | 2/1980 | Vredenburg, Sr. | |
| 4,236,308 A | | 12/1980 | Vredenburg, Sr. | |
| 4,996,773 A | * | 3/1991 | Albertson | A01G 3/08 30/121 |
| 5,257,457 A | | 11/1993 | Cotter | |
| 5,682,679 A | * | 11/1997 | Dorma | B23D 61/025 30/249 |

(Continued)

*Primary Examiner* — Hwei-Siu C Payer
(74) *Attorney, Agent, or Firm* — Dennis L. Thomte; Thomte Patent Law Office LLC

(57) ABSTRACT

The first embodiment of the tool for girdling the trunk of a tree includes an elongated and horizontally disposed handle having first and second ends. The tool also includes a horizontally disposed cutting blade support having a first elongated arm portion and a curved arm portion. The first elongated arm portion is pivotally connected to the handle intermediate the lengths thereof. A linkage also pivotally connects the second end of the handle to the first end of the first elongated arm portion. A cutting blade carriage is selectively movably secured to the curved arm portion to compensate for various tree trunk diameters. A second embodiment of the tool includes an elongated handle which is adjustably secured to a cutting blade support which has a cutting blade secured thereto which is forced into engagement with the tree trunk by a spring arm.

1 Claim, 4 Drawing Sheets

(56) References Cited

U.S. PATENT DOCUMENTS

| | | | |
|---|---|---|---|
| 9,840,021 B1* | 12/2017 | Armbrust | B27L 1/06 |
| 2004/0003500 A1 | 1/2004 | Murcia | |
| 2007/0124941 A1* | 6/2007 | Rastegar | A01G 3/08 |
| | | | 30/249 |

* cited by examiner

TREE GIRDLING TOOL

CROSS REFERENCE TO RELATED APPLICATION

This is a Divisional Application of application Ser. No. 15/214,715 filed Jul. 20, 2016, entitled TREE GIRDLING TOOL now. U.S. Pat. No. 9,840,021.

BACKGROUND OF THE INVENTION

Field of the Invention

This invention relates to a tree girdling tool and more particularly to a tree girdling tool which is an improvement over the prior art devices. More particularly, this invention relates to a tree girdling tool which is easily adapted to girdle trees of various diameters. Even more particularly, this invention relates to a tree girdling tool which is easy to use.

Description of the Related Art

Tree girdling, also called, ring-barking, is the complete removal of a strip of bark (consisting of cork cambium, phloem, cambium and sometimes going into xylem) from around the entire circumference of the trunk of a tree. Girdling results in the death of the tree over time. Many prior art tree girdling devices have been previously provided but the prior art devices are expensive, difficult to use, are inefficient, etc. Examples of the prior art tree girdlers are illustrated in U.S. Pat. Nos. 4,029,134; 4,188,718; 4,236,308 and 5,257,457.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Two embodiments of the hand-held tool of this invention are disclosed for girdling the trunk of a tree. The first embodiment of the tool includes an elongated and horizontally disposed handle having a first end and a second end. The tool also includes an elongated and horizontally disposed first link having first and second ends with the first end of the first link being pivotally secured, about a vertical axis, to the second end of the handle. The tool further includes an elongated and horizontally disposed second link having first and second ends with the first end of the second link being pivotally secured, about a vertical axis, to the second end of the first link. The tool also includes a horizontally disposed cutting blade support having a first elongated arm portion with first and second ends and a curved arm portion, having first and second ends, which extends from the second end of the first elongated arm portion. The first end of the first elongated arm portion of the cutting blade support is pivotally secured, about a vertical axis, to the second end of the second link. The first elongated arm portion of the cutting blade support is pivotally secured, about a vertical axis, to the handle inwardly of the second end of the handle. The curved arm portion of the cutting blade support is configured to be positioned adjacent the trunk of a tree and is designed to enable the tool to be used with trees having various trunk diameters.

The curved arm portion of the cutting blade support has a plurality of spaced-apart pin openings formed therein. A blade carriage is selectively movably mounted on the curved arm portion of the cutting blade support. A pin is associated with the cutting blade support which is configured to extend through one of the pin openings in the curved arm portion to adjustably secure the blade carriage to the curved arm portion to adjust the blade carriage to various tree diameters. A cutting blade is secured to the blade carriage for girdling the trunk of the tree as the tool is moved around the tree. The handle is in movable engagement, intermediate its length, with the trunk of the tree as the tool is moved around the tree.

The second embodiment of the tool includes an elongated and horizontally disposed handle having first and second ends. The second embodiment of the tool includes an elongated and horizontally disposed cutting blade support including a first support arm portion having a first end, a second end, an inner side and an outer side. The cutting blade support also includes a second support arm portion, having first and second ends, which extends generally transversely from the second end of the first support arm portion. The outer side of the first support arm portion has a plurality of spaced-apart notches formed therein. The second end of the handle is selectively adjustably secured to one of the notches in the first support arm portion so that the tool may be used with various tree trunk diameters. The second embodiment also includes an elongated blade support having first and second ends. The blade support has its first end pivotally secured to the second end of the second support arm portion about a vertical axis whereby the blade support is movable towards the second support arm portion and is movable away from the second support arm portion. A cutting blade is mounted on the blade support for engagement with the trunk of the tree. A spring means is associated with the blade support which yieldably urges the cutting blade into cutting engagement with the trunk of the tree. The second embodiment also includes a guide wheel which is rotatably mounted on the second end of the blade support for engagement with the trunk of a tree.

The disclosure also describes the methods of using the first and second embodiments of the tool to girdle the trunk of a tree.

It is therefore a principal object of the invention to provide an improved hand-held tool for girdling the trunk of a tree.

A further object of the invention is to provide a tool of the type described which is easy to use.

A further object of the invention is to provide a tool of the type described which enables a tree to be girdled with a minimum of effort.

A further object of the invention is to provide a tool of the type described which is safe to use.

A further object of the invention is to provide a tool of the type described which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
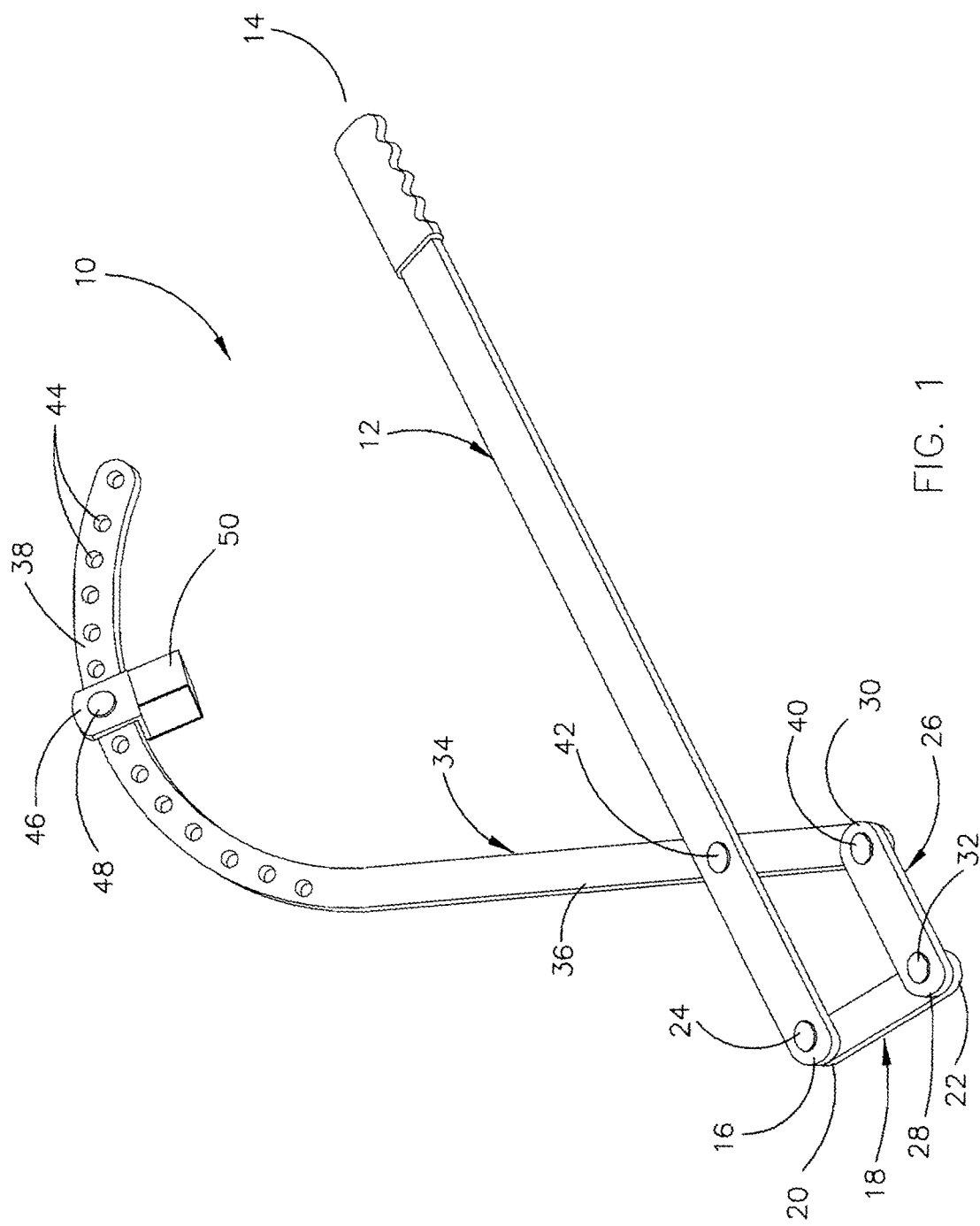
FIG. 1 is a perspective view of a first embodiment of the tree girdling tool of this invention.
Figure 2:
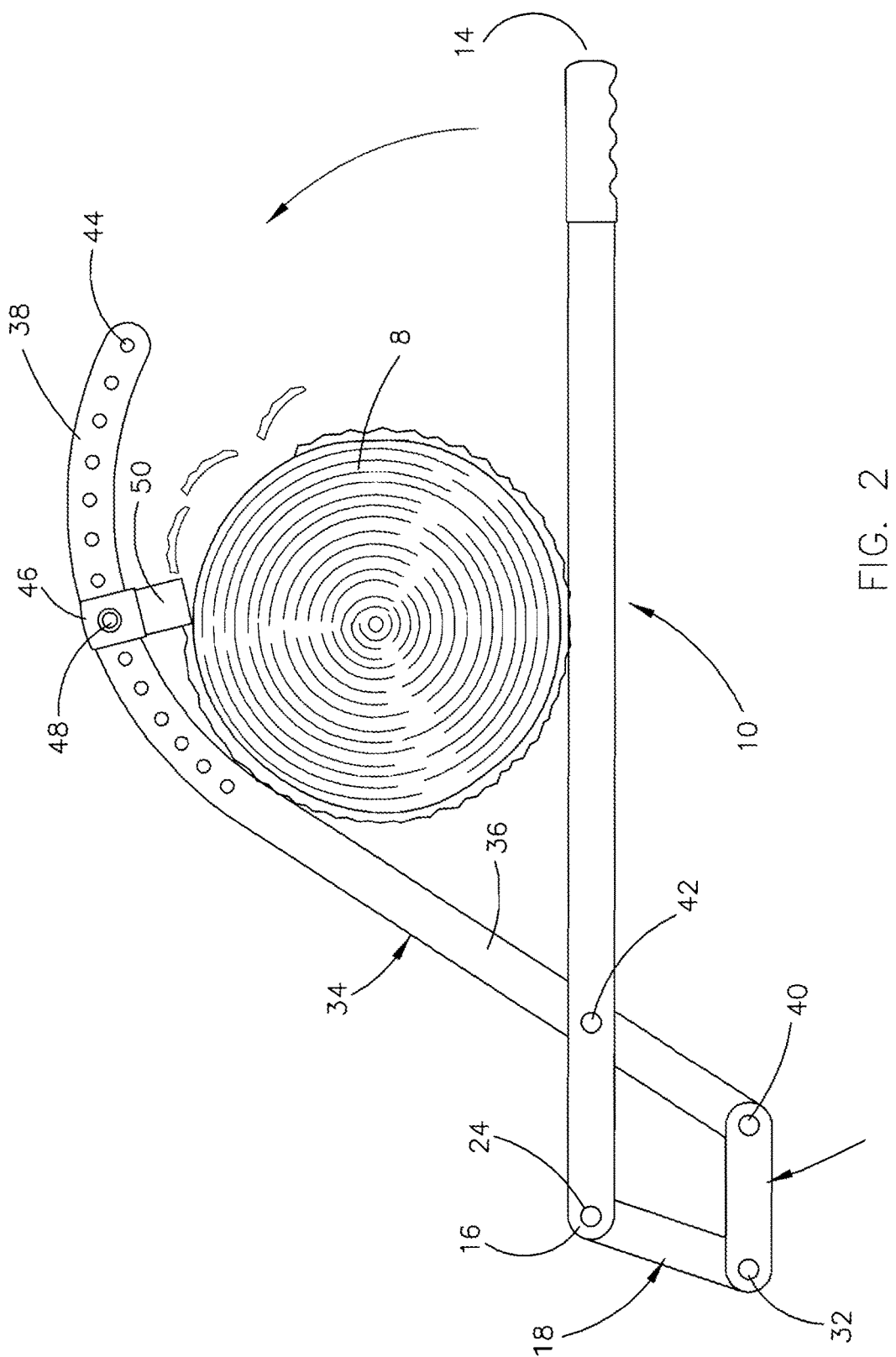
FIG. 2 is a top view of the tool of FIG. 1 being used to girdle a tree.

The first embodiment of Applicant's hand-held tool for girdling the trunk 8 of a tree is shown in FIGS. 1 and 2 and is referred to by the reference numeral 10. Tool 10 includes an elongated and horizontally disposed handle 12 having a first end 14 and a second end 16. The numeral 18 refers to a horizontally disposed first link having ends 20 and 22. The end 20 of link 18 is pivotally secured, about a vertical axis, to handle 12 at end 16 thereof by a pivot pin 24. The numeral 26 refers to a horizontally disposed second link having ends 28 and 30. End 28 of link 26 is pivotally secured, about a vertical axis, to end 22 of link 18 by a pivot pin 32.

The numeral 34 refers to a horizontally disposed cutting blade support which includes an elongated arm portion 36 and a curved arm portion 38. The free end of arm portion 36 is pivotally secured, about a vertical axis, to the second end 30 of link 26 by a pivot pin 40. Arm portion 36 is pivotally secured, about a vertical axis, to handle 12 by a pivot pin 42. As seen, curved arm portion 38 has a plurality of spaced-apart pin openings 44 formed therein. A blade carriage 46 is selectively movably mounted on curved arm portion 38 and is maintained in various positions by a pin 48 which is received in one of the pin openings 44. A generally U-shaped cutting blade 50 is mounted on carriage 46 for movement therewith. The tool 10 is preferably comprised of metal such as aluminum, steel, iron, etc.

The tool 10 is used to girdle a tree as will now be described. The cutting blade support 34 and the handle 12 will be "opened" by pivoting the handle 12 in a clockwise direction and by pivoting the cutting blade support 34 in a counter clock-wise direction. The tool 10 will then be positioned around the trunk 8 of the tree to be girdled. The cutting blade carriage 46 will then be adjusted with respect to the curved arm portion 38 to adjust cutting blade support 34 to the diameter of the trunk 8 of the tree. The handle 12 will then be pulled towards the trunk 8 of the tree until it engages the trunk 8 as seen in FIG. 2. At that time, the U-shaped cutting blade 50 will be drawn into engagement with the trunk 8 of the tree. As the handle 12 and tool 10 are pulled around the tree in a counter clock-wise direction as viewed in FIG. 2, the U-shaped cutting blade 50 will cut into the trunk 8 to girdle the same. The handle 12 and the tool 10 will be pulled around the trunk 8 until the trunk 8 has been completely girdled. As the tool 10 is pulled around the trunk, the interaction of the handle 12, links 18 and 26, and the pivotal connection of the handle 12 with the cutting blade support 34 will maintain the cutting blade 50 into cutting engagement with the trunk of the tree to girdle the same.

Figure 4:
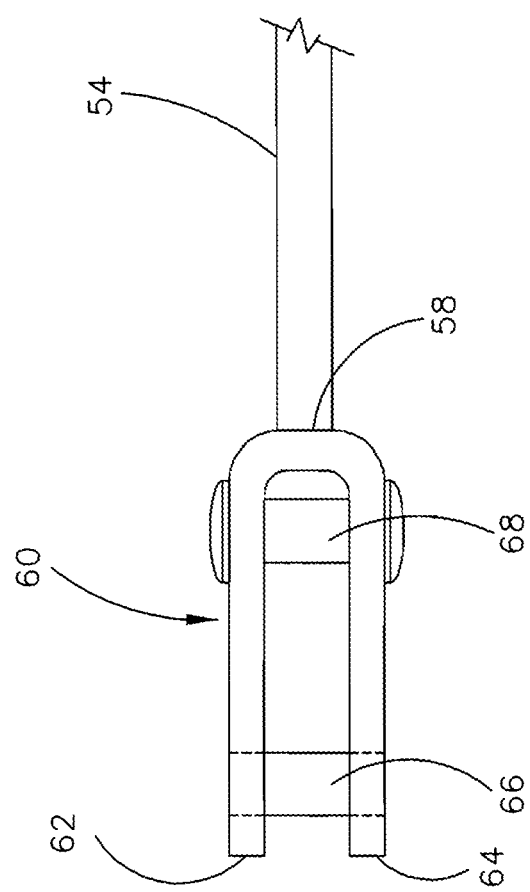
FIG. 4 is a partial top view which illustrates the yoke at one end of the handle of the tool of FIG. 3.

The numeral 52 refers to the second embodiment of the tool of this invention for girdling the trunk 8 of a tree. Tool 52 includes an elongated and horizontally disposed handle 54 having ends 56 and 58. End 58 of handle 54 has a U-shaped or Y-shaped yoke 60 secured thereto which includes spaced-apart legs 62 and 64. A pair of spaced-apart pins 66 and 68 extend between legs 62 and 64 as seen in the drawings. The pins 66 and 68 as shown in FIG. 4 are fixed in place. However, at least one of the pins 66 and 68 may be selectively removably secured to the yoke 60.

The numeral 70 refers to a horizontally disposed cutting blade support having first and second support members 72 and 74. Support member 72 is generally transversely disposed with respect to handle 54. Support member 74 is generally transversely disposed with respect to support member 72. Support member 72 has a plurality of spaced-apart notches 76 formed therein. The end 58 of handle 54 is positioned so that pins 66 and 68 are positioned on opposite sides of support member 72 with pin 66 adapted to be received in one of the notches 76 to compensate for tree trunks of various diameters. As stated above, one of the pins 76 and 78 may be temporarily removed from the yoke 60 to facilitate the connection of the yoke 60 to the support 70.

The numeral 78 refers to an elongated pivotal blade support arm having ends 80 and 82. End 80 of support arm 78 is pivotally secured, about a vertical axis, to the free end of support member 74 by a pivot pin 84. A U-shaped cutting blade 86 is secured to support arm 78 by a pin 88. A guide wheel 90 is rotatably mounted to support arm 78 at end 82 thereof. A down pressure spring 92 extends between support member 74 and support arm 78 to yieldably urge support arm 78 towards trunk 8 so that wheel 90 stays in engagement with the trunk 8 of the tree and so that cutting blade 86 will girdle the trunk 8 as the tool 52 is rotated around the tree.

Figure 3:
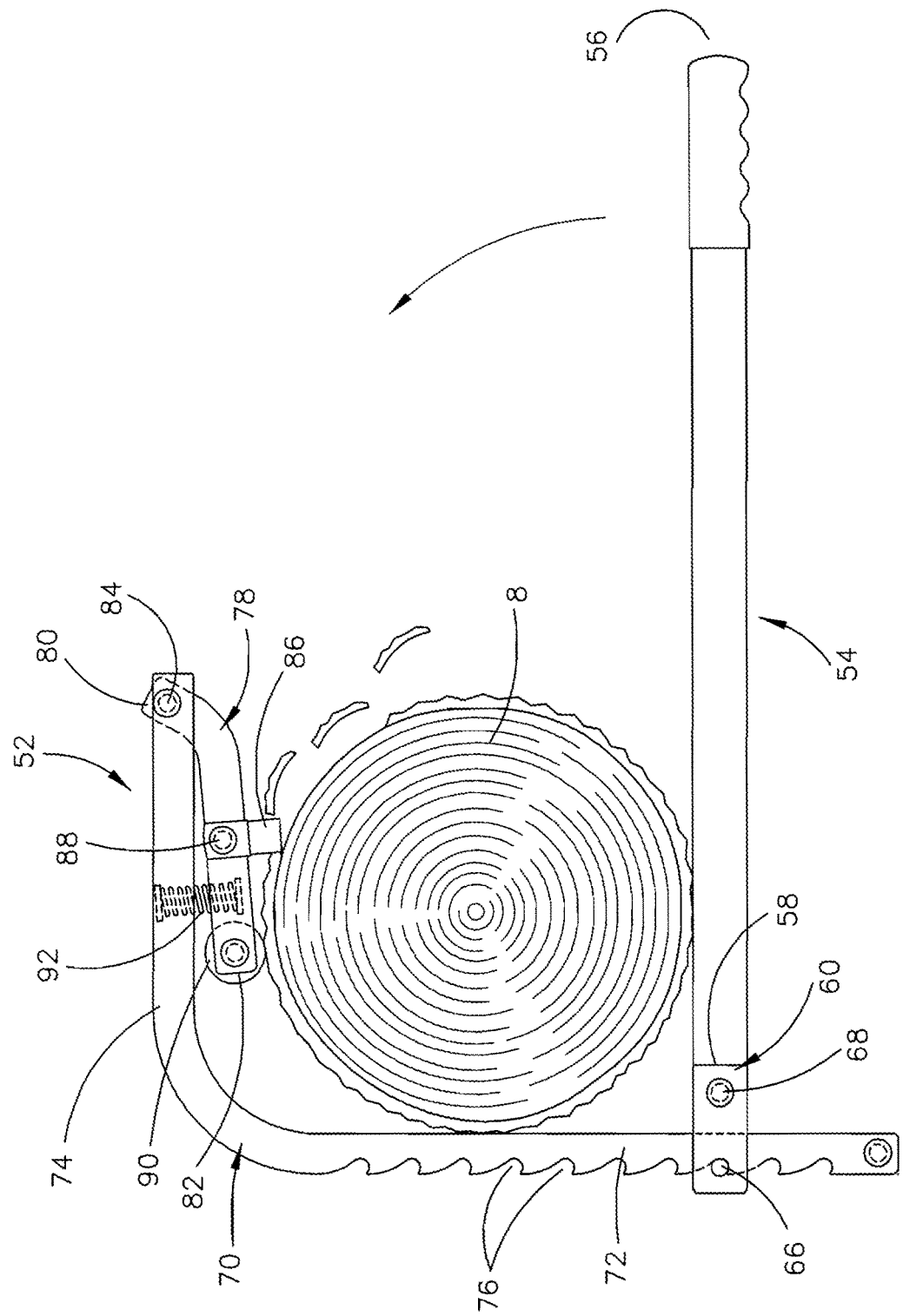
FIG. 3 is a top view illustrating a second embodiment of the tree girdling tool of this invention being used to girdle a tree.

The tool 52 is used as will now be described. The tool 52 is positioned around the tree trunk 8 as seen in FIG. 3. The handle 54 will be attached to the cutting blade support 70 in a manner so as to accommodate various tree trunk diameters which is made possible by positioning the pin 66 in the proper notch 76. At that time, the spring 92 will urge the support arm 78 inwardly towards the trunk 8 so that cutting blade 86 engages the trunk 8 with wheel 82 being in engagement with trunk 8 as seen in FIG. 3. The handle 54 and the tool 52 are then pulled around the trunk 8 in a counter clock-wise direction as indicated in FIG. 3. As the tool 52 is pulled around the trunk 8, the cutting blade 86 will girdle the trunk 8 of the tree. During the movement of the tool 52 around the trunk 8, the handle 54 will be in engagement with the trunk 8 as seen in FIG. 3. The tool 52 is preferably comprised of a metal such as aluminum, steel, iron, etc.

It can be seen that the tools 10 and 52 are well constructed and will function in a safe and efficient manner. Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A hand-held tool for girdling the trunk of a tree, comprising:

an elongated and horizontally disposed handle having a first end and a second end;

a horizontally disposed cutting blade support having a first elongated arm portion with first and second ends and a curved arm portion with first and second ends, said curved arm portion extending from said second end of said first elongated arm portion;

said first elongated arm portion and said curved arm portion dwelling in the same horizontal plane;

said first elongated arm portion of said cutting blade support being pivotally secured about a vertical axis to said handle inwardly of said second end of said handle;

an elongated and horizontally disposed first link being pivotally secured, about a vertical axis, to said first end of said first elongated arm portion of said cutting blade support;

an elongated and horizontally disposed second link having first and second ends;

said first end of said second link being pivotally secured, about a vertical axis, to one end of said first link;

said second end of said second link being pivotally secured, about a vertical axis, to said second end of said handle;

said curved arm portion of said cutting blade support configured to be positioned adjacent the trunk of a tree;

said curved arm portion of said cutting blade support having a plurality of spaced-apart pin openings formed therein;

a horizontally disposed blade carriage selectively movably mounted on said curved arm portion of said cutting blade support;

a pin associated with said cutting blade support and configured to extend through one of said pin openings in said curved arm portion of said cutting blade support to adjustably secure said blade carriage to said curved arm portion of said cutting blade support to adjust said blade carriage to various tree diameters;

a cutting blade secured to said blade carriage for girdling the trunk of the tree as said handle is moved around the tree;

said handle being in movable engagement, intermediate its length, with the trunk of the tree as said handle is moved around the tree; and said cutting blade support being in movable engagement, intermediate its length, with the trunk of the tree as said handle is moved around the tree.

* * * * *